US008346597B2

(12) United States Patent
Waldron, III et al.

(10) Patent No.: US 8,346,597 B2
(45) Date of Patent: Jan. 1, 2013

(54) CUSTOMER-LEVEL MACRO BUSINESS PERFORMANCE MONITORING

(75) Inventors: Willard H. Waldron, III, Charlotte, NC (US); Timothy James Mark, Berkeley, CA (US)

(73) Assignee: Bank of America Corporation, Charlotte, NC (US)

( * ) Notice: Subject to any disclaimer, the term of this patent is extended or adjusted under 35 U.S.C. 154(b) by 316 days.

(21) Appl. No.: 12/790,324

(22) Filed: May 28, 2010

(65) Prior Publication Data

US 2011/0295654 A1 Dec. 1, 2011

(51) Int. Cl.
*G06Q 10/00* (2012.01)
(52) U.S. Cl. ............... 705/7.41; 705/7.38; 705/7.37; 705/7.31
(58) Field of Classification Search ........ 705/7.11–7.42; 709/201–244; 707/601–831; 345/1.1–111
See application file for complete search history.

(56) References Cited

U.S. PATENT DOCUMENTS

| | | | |
|---|---|---|---|
| 7,401,266 B1 * | 7/2008 | LaMan, III | 714/48 |
| 7,801,761 B2 * | 9/2010 | Varadarajan et al. | 705/7.29 |
| 7,818,203 B1 * | 10/2010 | Pearson et al. | 705/7.29 |
| 2002/0133368 A1 | 9/2002 | Strutt et al. | |
| 2003/0187719 A1 | 10/2003 | Brocklebank | |
| 2005/0149382 A1 * | 7/2005 | Fenner et al. | 705/10 |
| 2007/0124184 A1 * | 5/2007 | Schmit et al. | 705/7 |
| 2007/0239515 A1 | 10/2007 | Hernandez et al. | |
| 2008/0313571 A1 | 12/2008 | Bushey et al. | |

OTHER PUBLICATIONS

International Search Report for PCT/US11/37992 dated Sep. 9, 2011.

* cited by examiner

*Primary Examiner* — R. David Rines
(74) *Attorney, Agent, or Firm* — Michael A. Springs; Moore & Van Allen PLLC; James C. Edwards (57) ABSTRACT

Embodiments of the invention relate to systems, methods, and computer program products for client/customer-centric macro (e.g., business-wide) monitoring of business performance and determination of business-wide customer impact trends associated with the client's/customer's composite relationship with the business. Additionally, embodiments provide for determining customer impact trends at other levels of the business relationship, such as at business unit/line of business levels, product/service levels and the like. Based on the determined customer impact trends, further determinations may be made regarding whether alerts are warranted based on the trends, and generating and communicating the alerts if warranted. Determining business-wide customer impact trends provides for the business to identify problems or potential problems that may adversely impact the global relationship between the overall client entity and the business implementing the performance monitoring system.

24 Claims, 4 Drawing Sheets

CUSTOMER-LEVEL MACRO BUSINESS PERFORMANCE MONITORING

FIELD

In general, embodiments of the invention relate to methods, systems, apparatus and computer program products for business performance monitoring and, more particularly, for customer-level performance monitoring and determination of business-wide customer impact trends that result in proactive response on behalf of the business to address the customer concerns.

BACKGROUND

Large enterprise entities, such as worldwide corporations and the like, have customers/clients that engage with various different facets of the enterprise. For example, a client may have an established business relationship with various different business units, also referred to herein as lines of business, throughout the large enterprise. Each of the various different business units may provide the client with one or more different products or services. Therefore, any one customer/client of the large enterprise may have business relationships with numerous different business units and may acquire numerous different products or services from the various different business units. In addition, the customers/clients may themselves be large enterprises or corporate entities made up of numerous subsidiaries, regional branches, national branches, individual units and the like.

In general, customer/clients that have numerous business relationships with different business units within the large enterprise are considered to be high value customers/clients in terms of the financial significance of the customer/client to the large enterprise. In this regard, if the high value customer/client was to significant decrease their relationship with the large enterprise or completely terminate the relationship, the large enterprise would be significantly affected from a financial standpoint. Thus, it is imperative that large enterprises provide such high value customers/clients with the highest level of service or customer care possible.

In most large enterprise corporations and the like, the enterprise tracks business performance at the business unit level and at the product/service level. Such performance tracking allows for the enterprise to gauge their business performance as it applies to a specific customer/client within the business unit and/or for a particular product/service. However, since such systems are business unit-centric and/or product/service-centric, they often fail to properly identify a potential customer/client problem or address client-to-client variances in what is important to a client/customer in terms of business performance (e.g., timeliness, quality, cost, etc.). Such business unit or product/service level performance monitoring is limited to only identifying a customer/client problem or a potential problem within that particular business unit or for that particular product/service. In addition, the business unit or product/service level aspect of the monitoring means that business performance metrics being tracked and/or monitored are often static metrics that are defined by the business unit or the product/service-line based on their specific needs.

A problem arises when such business unit or product/service performance monitoring is unable to identify potential problems that may exist or may be trending toward existence for the entire relationship with client/customer. For example, while performance metrics for the customer/client related to one or more business units or product/service lines may be at acceptable levels, if the performance metrics were to be aggregated across all business units and/or all product/service lines, the overall customer/client performance metrics, may indicate a business-wide performance trend that globally impacts the customer/client and requires the enterprise to take necessary corrective action. For example, if consistently moderate levels of adverse performance metrics exist across multiple business units and/or product lines, the global impact of such performance metrics may go undetected by a large enterprise business. In the event such global impact goes undetected by the large enterprise, the large enterprise can not be proactive in address the business performance problem prior to the problem being escalated by the customer and/or adversely affecting the business relationship with the customer/client on a global level.

In another example, performance metrics at the business unit or product service line level may only gauge business performance for each customer/client unit (e.g., subsidiaries, regional branches, national branches, individual units and the like) and may fail to take into account business performance for the customer/client in whole.

Therefore, a need exists to provide for a system that provides client/customer-centric macro (e.g., business-wide) monitoring of business performance. The desired system should provide for monitoring business performance metrics for a client/customer across any and/or all of the areas of the business enterprise that the client/customer has a relationship with, such as different business units/lines-of-business, different product/service lines and the like. The result of the monitoring should be the identification of business-wide business customer impact trends that may adversely affect the customer/client as a whole or at the individual customer/client-unit level. Moreover, the desired system should additionally provide for identifying business-unit and/or product/service level business performance trends that may adversely affect the customer/client as a whole or individual customer/client-units that comprise the customer/client. In addition to identification of the customer impact trends, the desired system should provide for automated means for notifying applicable corrective action entities within the large enterprise, such as customer service personnel or the like, for the purpose to taking necessary corrective action to mitigate or eliminate the business performance impact trend.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for client/customer-centric macro (e.g., business-wide) monitoring of business performance. Moreover, embodiments of the present invention provide for enterprise-wide/business-wide monitoring of performance metrics at the client-level, in addition to monitoring at secondary levels, such as business unit or line-of business levels, tertiary levels, such as product/service line levels and so on. The performance metrics may be identified by the business entity implementing the system and/or the performance metrics may be configured by the client customer. Based on monitored business performance metrics, business-wide customer impact trends may be determined for the client or any divisible unit of the client, in addition to determining business-unit and/or product/service level performance trends associated with the customer/client and/or any customer/client unit. What constitutes a business performance trend may be defined by the business entity implementing the system and may be based on inputs or trend criteria from the customer/client.

According to further embodiments of the invention, based on determination of customer impact trends decisions are made as to whether the impact trend warrants an automated notification/alert to be communicated to a requisite entity within the business, such as a customer service department representative or the like. Alerts may serve to immediately notify a business entity of a negative business performance impact trend associated with a client/customer, so that the business may immediately address corrective actions needed to mitigate or eliminate the negative business performance trend.

Further embodiments of the present invention provide for a dashboard type application whereby the business entity implementing the system of the present invention can track monitored business performance metrics and assess determined customer impact trends for selected customers on a primary level, e.g., business/enterprise-wide basis, a secondary level, e.g., business unit/line of business level, a tertiary basis, e.g., a product service level and so on. The dashboard application may be further configured to send and/or receive impact trend notifications/alerts to provide the user of immediate notification of an impact trend affecting a customer.

In addition to identification of the customer impact trends, the desired system should provide for automated means for notifying applicable corrective action entities within the large enterprise, such as customer service personnel or the like, for the purpose to taking necessary corrective action to mitigate or eliminate the business performance impact trend.

A method for managing business performance at an individual customer-level provides for first embodiments of the invention. The method includes monitoring, via a computing device processor, a plurality of business performance metrics associated with a customer, determining, via a computing device processor, one or more business-wide customer impact trends based on the plurality of business performance metrics and storing, in computing device memory, the one or more customer impact trends.

In further specific embodiments the method includes determining, via a computing device processor, if one or more of the one or more business-wide customer impact trends warrant generating an alert and communicating, via a computing device, a customer impact alert to a corrective action entity if an alert is determined to be warranted.

In still further specific embodiments the method includes determining, via a computing device processor, one or more business unit-related (e.g., line of business-related) customer impact trends based on the plurality of business performance metrics. In such embodiments, the method may further include determining, via a computing device processor, if one or more of the one or more business unit-related customer impact trends or the one or more business wide-related customer impact trends warrant an alert and communicating, via a computing device, a customer impact alert to a corrective action entity if an alert is determined to be warranted. In further specific embodiments, determining if one or more of the one or more business unit-related customer impact trends warrant an alert further includes aggregating results of business unit-related customer impact trends from different business units to determine if corrective action is warranted.

In other specific embodiments the method includes determining, via a computing device processor, one or more product-related customer impact trends based on the plurality of business performance metrics. In such embodiments the method may further include determining, via a computing device processor, if one or more of the one or more product-related customer impact trends or the one or more business-wide customer impact trends warrants an alert corrective action and communicating, via a computing device, a customer impact alert to a corrective action entity if an alert is determined to be warranted. In further specific embodiments, determining if one or more of the one or more product-related customer impact trends warrant an alert further includes aggregating results of product-related customer impact trends from different products to determine if corrective action is warranted.

Moreover, in further specific embodiments the method includes determining, via a computing device processor, one or more customer unit-related customer impact trends based on the plurality of business performance metrics. The customer unit may be specific place of business, such as a retail location, a specific geographic region encompassing place(s) of business, such as city a region or the like or any other customer-defined entity that is characterized as a unit. In such embodiments, the method may further include determining, via a computing device processor, if one or more of the one or more customer unit-related customer impact trends or the one or more business-wide customer impact trends warrants an alert and communicating, via a computing device, a customer impact alert to a corrective action entity if an alert is determined to be warranted. In further specific embodiments, determining if one or more of the one or more customer-unit customer impact trends warrant corrective action further includes aggregating results of customer-related customer impact trends from different customer units to determine if corrective action is warranted.

An apparatus for managing business performance at an individual customer-level defines second embodiments of the invention. The apparatus includes a computing platform including a memory and at least one processor. The apparatus further includes a customer-based business performance management application stored in the memory and executable by the processor. The application includes a business performance monitoring routing configured to monitor a plurality of business performance metrics associated with a customer. The application further includes a business performance trend determination routine configured to determine one or more business-wide customer impact trends based on the plurality of business performance metrics and store the one or more business-wide customer impact trends in the memory.

In further specific embodiments of the apparatus the customer-based business management application further includes an alert determination and communication routine configured to determine if one or more of the one or more business-wide customer impact trends warrant an alert and initiate communication of a customer impact alert to a corrective action entity if an alert is determined to be warranted.

In still further specific embodiments of the apparatus, the business performance trend determination routine is further configured to determine one or more business unit-related customer impact trends based on the plurality of business performance metrics. In such embodiments of the apparatus, the customer-based business management application may include an alert determination routine configured to determine if one or more of the one or more business unit-related customer impact trends or the one or more business-wide customer impact trends warrant an alert and initiate communication of a customer impact alert to a corrective action entity if an alert is determined to be warranted. In such embodiments of the apparatus, the alert determination routine may be further configured to aggregate results of business unit-related customer impact trends from different business units to determine if corrective action is warranted.

In other specific embodiments of the apparatus, the business performance trend determination routine is further configured to determine one or more product-related customer impact trends based on the plurality of business performance metrics. In such embodiments of the apparatus, the customer-based business management application further includes an alert determination routine configured to determine if one or more of the one or more product-related customer impact trends or the one or more business-wide customer impact trends warrant an alert and initiate communication of a customer impact alert to a corrective action entity if an alert is determined to be warranted. In further such embodiments, the alert determination routine may be further configured to aggregate results of product-related customer impact trends from different products to determine if corrective action is warranted.

Moreover, in further related embodiments of the apparatus the business performance trend determination routine is further configured to determine one or more customer unit-related customer impact trends based on the plurality of business performance metrics. In such embodiments, the customer-based business management application may further include an alert determination routine configured to determine if one or more of the one or more customer unit-related customer impact trends or the one or more business-wide customer impact trends warrant an alert and initiate communication of a customer impact alert to a corrective action entity if an alert is determined to be warranted. In further related embodiments, the alert determination routine may be further configured to aggregate results of customer unit-related customer impact trends from different customer units to determine if corrective action is warranted.

A computer program product including a computer-readable medium provides for third embodiments of the invention. The computer program product includes a first set of codes for causing a computer to monitor a plurality of business performance metrics associated with a customer, a second set of codes for causing a computer to determine one or more business-wide customer impact trends based on the plurality of business performance metrics and a third set of codes for causing a computer to store the one or more customer impact trends. In further embodiments of the computer program product the medium includes a fourth set of codes for causing a computer to determine if one or more of the one or more business-wide customer impact trends warrant an alert and a fifth set of codes for causing a computer to communicate a customer impact alert to a corrective action entity if an alert is determined to be warranted.

Based on these determined future financial transactions/obligations, the financial institution can provide real-time financial advice, such as financial advice alerts or the like, to a customer who is contemplating, or otherwise in the vicinity of conducting, a financial transaction, such as a purchase transaction. For example, the financial advice alert may remind the customer of an imminent recurring financial obligation, such as an upcoming mortgage/rent, automobile payment or the like. Additionally, the financial advice alert may provide indication that the pending transaction that the customer is contemplating or in the process of conducting will provide for a projected account deficit or non-sufficient funds occurrence in light of the future financial obligation. As a result of the financial advice alerts herein disclosed, customers are able to make informed decisions regarding contemplated financial transactions.

Thus, further details are provided below for systems, apparatus, methods and computer program products for client/customer-centric macro (e.g., business-wide) monitoring of business performance and determination of business-wide customer impact trends associated with the client's/customer's composite relationship with the business. Additionally, embodiments provide for determining customer impact trends at other levels of the business relationship, such as at business unit/line of business levels, product/service levels and the like. Determining business-wide customer impact trends associated with a client's composite relationship with a business, provides for the business to identify problems or potential problems that may adversely impact the global relationship between the overall client entity, such a large corporate entity or conglomerate, and the business implementing the performance monitoring system.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, present embodiments herein disclosed provide for client/customer-centric macro (e.g., business-wide) monitoring of business performance and determination of business-wide customer impact trends associated with the client's/customer's composite relationship with the business. Determining business-wide customer impact trends associated with a client's composite relationship with a business, provides for the business to identify problems or potential problems that may adversely impact the global relationship between the overall client entity, such a large corporate entity or conglomerate, and the business implementing the performance monitoring system.

Additional embodiments provide for determining customer impact trends at other levels of the business relationship, such as at business unit/line of business levels, product/service levels and the like. By providing for determination of customer impact trends at levels other than business/enterprise-wide, the business is able to easily determine the root cause of business/enterprise-wide customer impact trends and rectify isolated customer impact trends that may not affect the client on a macro level.

Further embodiments of the invention provide for determining whether the customer impact trends rise to the level or otherwise necessitate generation and communication of alerts, which serve to notify a business entity, such as customer service or the like, that an adverse performance impact trend associated with the client has been determined and requires immediate attention. In specific embodiments, the alerts, once determined to be warranted, are generated and communicated automatically. Immediate attention and or corrective action on behalf of the alert recipient mitigates or eliminates the problems surrounding the adverse performance impact trend. Such automated communication of alerts provide for corrective action to ensue immediately after a negative impact performance trend is determined, so as mitigate the trend or eliminate further trending.

Figure 1:
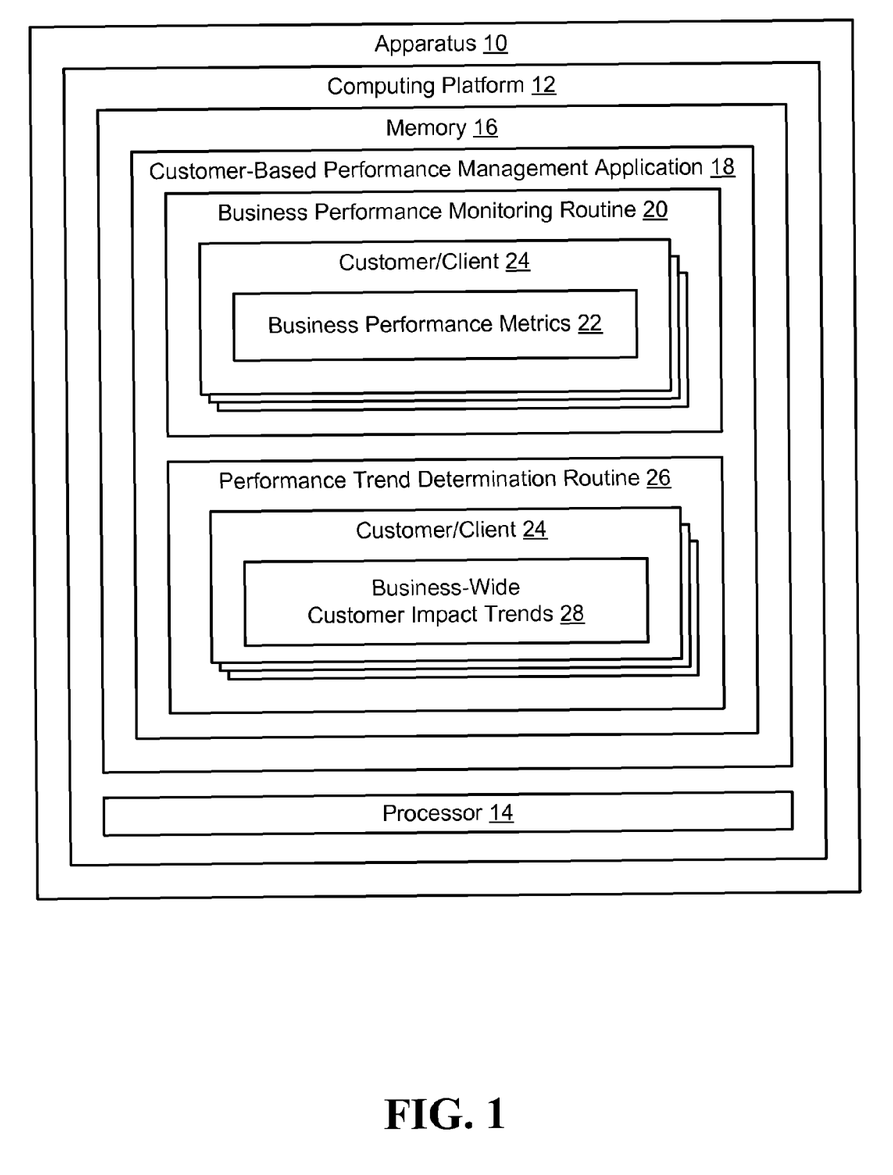
FIG. 1 is schematic diagram of an apparatus configured to provide customer-based business performance management, in accordance with embodiments of the present invention.

FIG. 1 provides a high level schematic diagram of an apparatus 10 configured for managing business performance and, more specifically, managing business performance at the individual customer-level enterprise-wide; in accordance with embodiments of the present invention. The apparatus 10 includes a computing platform 12 having at least one processor 14 and a memory 16.

The memory 16 of apparatus 10 stores customer-based performance management application 18 that is configured to monitor business performance metrics associated with customers/clients and determine performance trends based on the monitored performance metrics. For the purpose of this invention the terms "customer" and "client" are used interchangeable to refer to the entity that is provided products or services by the business. In certain embodiments of the invention, the business may implement the system to provide monitoring and performance impact trend determination for customers/clients deemed to be high-value customers/clients, customers that significantly impact the financial performance of the business.

Thus, the performance management application 18 includes business performance monitoring routine 20 configured to monitor business performance metrics 22 associated with a customer/client 24. The business performance metrics 22 that are monitored will vary depending on the business, the customer/client and the relationship between the business and the customer/client. As such, the business performance metrics 22 may be configured by the business entity implementing the performance management system, the customer/client or a combination of the business entity and customer/client. Thus, in certain embodiments of the invention, the monitored business performance metrics 22 will vary from customer-to-customer. In certain embodiments of the invention, the business performance metrics 22 may associated with quality, timeliness, reliability or any other facet of the relationship deemed to impact the customer/client.

As noted, the performance management application 18 is configured to be a customer-based application provides for monitoring of performance metrics on a customer/client basis. This customer-centric approach provides for the business performance monitoring routine 20 to monitor business performance metrics 22 across the entire business, in particular, across all aspects of a global-type enterprise business, such as all subsidiaries, business units/lines of business, product/service lines and the like.

Further, customer-based performance management application 18 includes performance trend determination routine 26 that is configured to determine business-wide customer impact trends 28 associated with customers/clients 24 based on the monitored performance metrics. "Business-wide" as defined herein means across all facets of the business, including, but not limited to, divisions, subsidiaries, business units/lines-of-business, product/service lines and the like. As such, business-wide customer impact trends 28 take into account performance metrics measured across the entire business. Business-wide impact trends 28 are instrumental in identifying problems and/or potential problems that might otherwise go unrecognized if trend analysis is limited to business unit/line of business, product/service line or the like. This is because business-wide impact trends aggregate the performance metrics business-wide in determining if a trend exists. The aggregation of the performance metrics may lead to determination of a trend, where trend analysis on another secondary or higher level (e.g., business unit/line of business, product/service-line) might otherwise not result in a trend. For example, if pluralities of business unit/line-of-business or product line performance metrics consistently show moderate levels of impact, the global impact may go unnoticed unless the performance metrics are aggregated or otherwise considered into total to determine an adverse global impact trend.

An impact trend 28 is defined as a predetermined rate of movement in the performance metrics over time or a consistent rate over time that may or has shown to adversely impact the customer/client. As such, what constitutes an impact trend may be defined by the business entity implementing the system, the customer/client or a combination of the business entity and the customer/client. Thus, according to specific embodiments, impact trends 28 may vary from customer-to-customer.

Additionally, customer impact trends 28 may be determined based on predetermined thresholds, dynamic thresholds, spectral analysis, fuzzy logic, linear regression modeling, Empirical Mode Decomposition (EMD) modeling or any other trend-determining algorithm. For example, a threshold may be defined as a predetermined number of occurrences of an event over a predetermined period of time, such that if the number of occurrences is met or exceeded, a trend is determined to exist. Dynamic thresholds may provide for near real-time variance of the number of occurrences of an event and/or the period of time for the occurrences based on ancillary attributes, such as the number of previous related trends, the number of previous customer inquires related to the trend/performance metric, the time of year/month/week/day etc, or the like.

Figure 2:
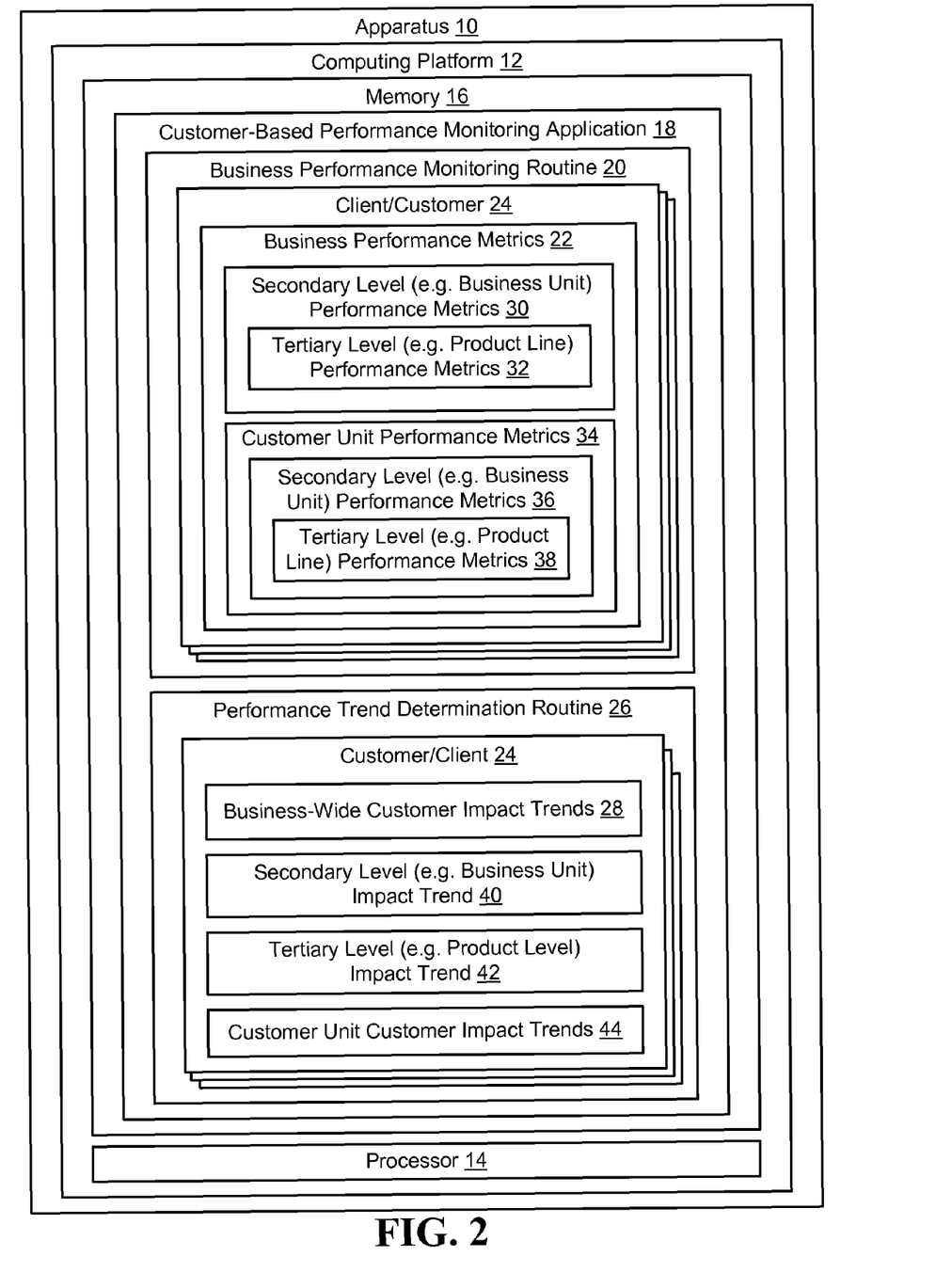
FIG. 2 is a schematic diagram of an apparatus configured to provide customer based business performance management at the enterprise level, the business unit/line-of-business level and the product/service level, in accordance with embodiments of the present invention.

Referring to FIG. 2, an apparatus 10 is shown that is configured for managing business performance at the customer-level and includes various different alternate embodiments of the invention. Similar to the apparatus of FIG. 1, apparatus 10 includes computing platform 12 having at least one processor 14 and a memory 16. The memory 16 stores customer-based performance monitoring application 18 configured to monitor performance metrics and determine customer impact trends based on the monitored performance metrics.

The customer-based performance monitoring application 18 includes business performance monitoring routine 20 configured to monitor business performance metrics 22. In specific embodiments, the business performance metrics 22 include secondary level performance metrics 30, such as, but not limited to, business unit performance metrics, line of business performance metrics, subsidiary performance metrics, or the like. Business performance metrics 22 additionally include tertiary level performance metrics 32, such as, but not limited to, product/service line performance metrics or the like. Reference herein to product or product line is construed to include a service or service line. In addition, while tertiary performance metrics 32 are depicted in FIG. 2 to be included within the secondary level performance metrics 30, in other embodiments they may exist as individual entities outside of the secondary performance metrics 30. Moreover, while secondary and tertiary level performance metrics are depicted, business performance metrics 22 may, in other embodiments, include further levels of performance metrics.

In other specific embodiments, the business performance metrics 20 include customer unit performance metrics 34, which comprise any divisible unit of the customer, such a grouping of customer units within a geographic region, specific units/branches/locations or the like. The customer unit performance metrics 34 include secondary level performance metrics secondary level performance metrics 36 associated with the specified customer unit, such as, but not limited to, business unit performance metrics, line of business performance metrics, subsidiary performance metrics, or the like. Customer unit performance metrics 34 additionally include tertiary level performance metrics 38 associated with the specified customer unit, such as, but not limited to, product/service line performance metrics or the like.

The customer-based performance monitoring application 18 additionally includes performance trend determination routine 26 configured to determine customer impact trends based on the monitored business performance metrics 22. In addition to determining business-wide customer impact trends (as discussed in relation to FIG. 1), alternate embodiments of the invention provide for determining secondary level impact trends 40, such as business unit/line of business trends, tertiary level impact tends 42, such as product/service line impact trends and customer unit customer impact trends 44, such as a geographic region impact trends, specific unit/branch/location impact trends or the like. In addition, while secondary and tertiary level performance levels are depicted, impact trends may, in other embodiments, include further levels of impact trends.

By providing for impact trends at levels other than business-wide, the monitoring application of the present invention is able to better assess isolated instances of impact trends adversely affecting the customer and determine the root-cause of business-wide customer impact trends. Similar to the business-wide impact trends discussed in relation to FIG. 1, the secondary level, tertiary level and customer unit impact trends 40, 42 and 44 may be determined based on predetermined thresholds, dynamic thresholds, spectral analysis, fuzzy logic, linear regression modeling, Empirical Mode Decomposition (EMD) modeling or any other trend-determining algorithm.

Figure 3:
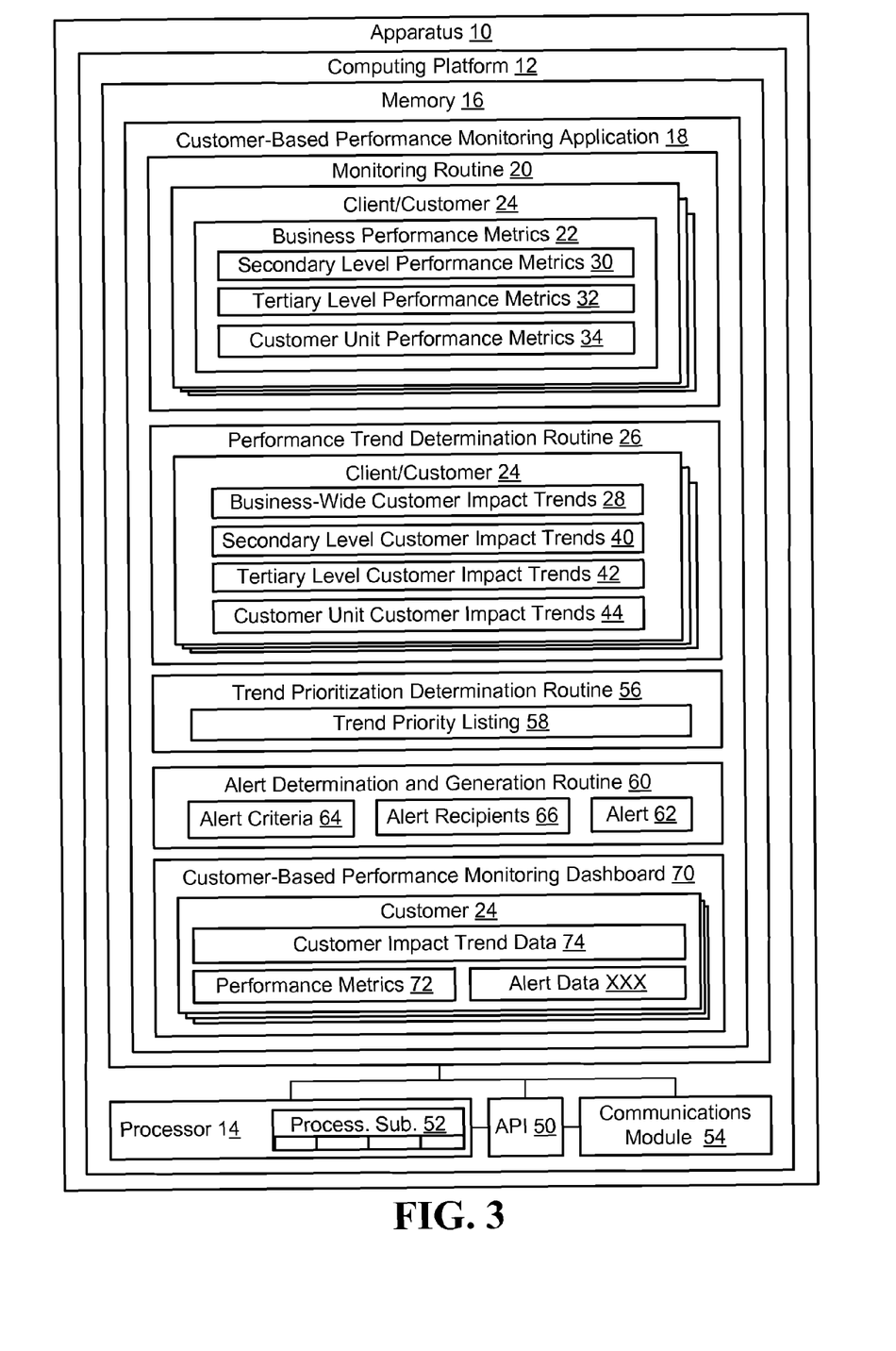
FIG. 3 is a schematic diagram of an apparatus configured to provide customer-based business performance management and highlighting various alternative embodiments of the present invention.

Referring to FIG. 3 shown is a more detailed block diagram of apparatus 10, according to embodiments of the present invention. The apparatus 10 is configured to provide monitoring of business performance metrics and determination of customer impact trends based on the monitoring. In addition to providing greater detail, FIG. 3 highlights various alternate embodiments of the invention. The apparatus 10 may include one or more of any type of computerized device. The present apparatus and methods can accordingly be performed on any form of computing device.

The apparatus 10 includes computing platform 12 that can receive and execute routines and applications. Computing platform 12 includes memory 16, which may comprise volatile and non-volatile memory, such as read-only and/or random-access memory (RAM and ROM), EPROM, EEPROM, flash cards, or any memory common to computer platforms. Further, memory 16 may include one or more flash memory cells, or may be any secondary or tertiary storage device, such as magnetic media, optical media, tape, or soft or hard disk.

Further, computing platform 12 also includes processor 14, which may be an application-specific integrated circuit ("ASIC"), or other chipset, processor, logic circuit, or other data processing device. Processor 14 or other processor such as ASIC may execute an application programming interface ("API") 50 that interfaces with any resident programs, such as customer-based performance monitoring application 18 or the like stored in the memory 16 of the apparatus 10.

Processor 14 includes various processing subsystems 52 embodied in hardware, firmware, software, and combinations thereof, that enable the functionality of apparatus 10 and the operability of the apparatus on a network. For example, processing subsystems 52 allow for initiating and maintaining communications and exchanging data with other networked devices. For the disclosed aspects, processing subsystems 52 of processor 14 may include any subsystem used in conjunction with customer-based performance monitoring application 18 or sub-routines, sub-modules thereof.

Computer platform 12 additionally includes communications module 54 embodied in hardware, firmware, software, and combinations thereof, that enables communications among the various components of the apparatus 10, as well as between the other networked devices. Thus, communication module 54 may include the requisite hardware, firmware, software and/or combinations thereof for establishing a network communication connection and communicating impact trend alerts to a requisite business entity, such as a customer service representative.

As described in relation to FIGS. 1 and 2, the memory 16 stores customer-based performance monitoring application 18 configured to monitor performance metrics and determine customer impact trends based on the monitored performance metrics. The customer-based performance monitoring application 18 includes business performance monitoring routine 20 configured to monitor business performance metrics 22, which, according to specific embodiments, include secondary level performance metrics 30, such as, but not limited to, business unit performance metrics, line of business performance metrics, subsidiary performance metrics, or the like; tertiary level performance metrics 32, such as, but not limited to, product/service line performance metrics or the like; and customer unit performance metrics 34, which comprise any divisible unit of the customer, such a grouping of customer units within a geographic region, specific units/branches/locations or the like.

The customer-based performance monitoring application 18 additionally includes performance trend determination routine 26 configured to determine customer impact trends based on the monitored business performance metrics 22. In addition to determining business-wide customer impact trends alternate embodiments of the invention provide for determining secondary level impact trends 40, such as business unit/line of business trends, tertiary level impact tends 42, such as product/service line impact trends and customer unit customer impact trends 44, such as a geographic region impact trends, specific unit/branch/location impact trends or the like.

According to specific embodiments of the invention, the customer-based performance monitoring application may further include trend prioritization determination routine 56 configured to determine a trend priority listing 58 for the plurality of customer impact trends determined by performance trend determination routine 26. The prioritization may be based on criteria defined by the business implementing the performance monitoring system, the customer/client or a combination of both the business and the customer/client. In specific embodiments trend prioritization determination routine 56 may be used in conjunction with alert determination and generation routine 60, such that the prioritization determination routine 56 is configured to define which impact trends are significant enough to warrant alerts being generated.

Thus, according to other specific embodiments of the invention, the customer-based performance monitoring application may further include alert determination and generation routine 60 that is configured to determine if a customer impact trend warrants an alert 62 and, if so, to generate and initiate communication of the alert 62 to one or more predetermined business entities, such as customer service representatives or the like. Customer impact alerts serve to immediately notify the designated business entity of customer impact trends as they occur, thereby allowing the business entity to perform necessary corrective action to mitigate or otherwise eliminate the customer impact trend. In specific embodiments, not every determined customer impact trend will dictate an alert, only those customer impact trends that are deemed important or significant enough will warrant customer impact alerts. As such, alert determination and generation routine includes alert criteria 62 which define the criteria for generating an alert for a specific customer impact trend. The criteria may include, but is not limited to, the type of customer impact trend, the rate of the customer impact trend, the business/products affected by the customer impact trend and the like.

Alert determination and determination routine 60 additionally includes alert recipient list 64 which includes a listing of designated business entities, such as customer service representatives or the like configured to receive the alert 62. The recipient list 64 may be configured to define which business entity receives what particular type of alerts and the communication means for communicating the alert to the business entity. Communication means may include, but are not limited to, dashboard notification, electronic mail, Short Message Service (SMS)/text, voice mail or the like. An alert recipient may configure the application to communicate the alert 62 to the recipient using one or more designated communication means. The recipient list 64 may additionally be configured to include a hierarchy listing of alert recipients which provides for next-in-line designated recipients to be notified of the alert if the preceding alert recipient has not responded to the alert or otherwise acknowledged receipt of the alert 62. In alternate embodiments of the invention, the application 18 may be configured to send the alerts to a customer entity, to notify the customer of the customer impact trends.

In still further embodiments of the invention, the customer-based performance management application 18 includes customer-based performance monitoring dashboard application 70 configured to provide network accessibility to customer/client-based performance metric data 72, customer impact trend data 74 and alert data 76. The dashboard application 70 may be configured to provide network accessibility to such data to the representatives/employees of the business implementing the performance monitoring system or, in alternate embodiments, full or limited accessibility to the customers. The dashboard application allows for the configuration of various aspects of the performance monitoring application 18 including, but not limited to, the business performance metrics 22, the customer impact trends 28, 40, 42, and 44 and alerts 62. Additionally, the dashboard application 60 provides for a visual representation of each customer's macro (i.e., business-wide) relationship with the business in terms of tracking performance metrics, customer impact trends, customer impact alerts and the like. In addition to visual representation of the macro-relationship, the dashboard application 60 may provide for drill-down capabilities that visually represent the secondary level relationships, such business unit/line of business or the like; the tertiary level relationships, such as product/service line or the like and any other level of the relationship. Additionally, the dashboard application provides for visual representation that shows the tracking of performance metrics, customer impact trends, alerts and the like at the customer unit level, such as customer divisions, geographical regions, individual units/locations and the like.

Figure 4:
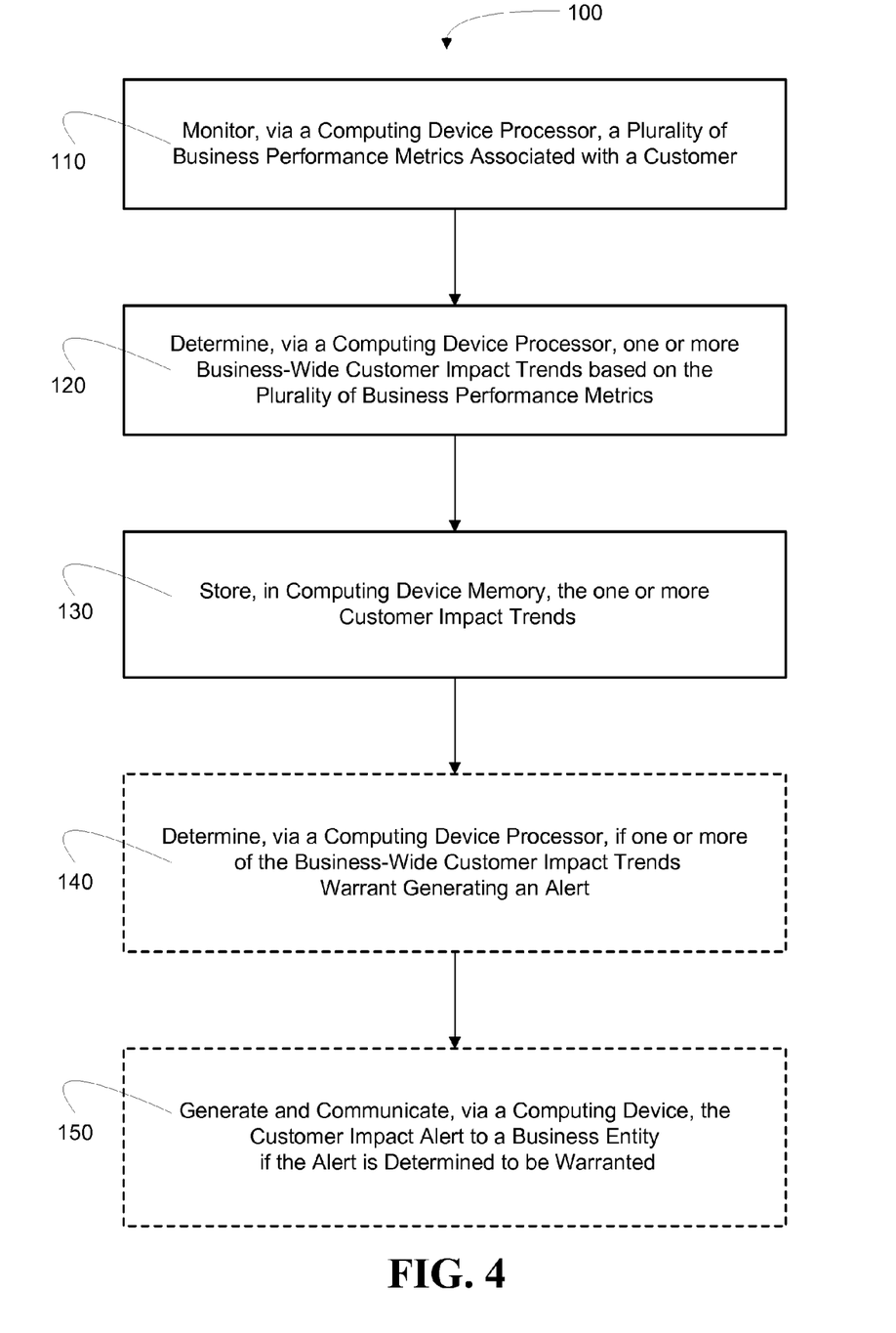
FIG. 4 is a flow diagram of a method for managing business performance at an individual customer-level; in accordance with embodiments of the present invention.

Referring to FIG. 4 a flow diagram is depicted of a method 100 for managing business performance at a customer-level, in accordance with embodiments of the present invention. At Event 110, a plurality of business performance metrics associated with a customer are monitored via a computing device processor. The business performance metrics may be defined by the business implementing the method, by the customer associated with the business performance metrics or a combination of both the business and the customer. As such, business performance metrics that are being monitored may vary from customer-to-customer depending on the specific needs and concerns of the business and/or the customer. The business performance metric may include any measurable indice related to the business, such as, but not limited to, quality-related metrics, timeliness-related metrics, reliability-related metrics and the like.

At Event 120, one or more business-wide customer impact trends are determined based on the plurality of business performance metrics. Customer impact trends define an adverse trend related to the business performance metrics, such as occurrence of performance events at a predetermined rate or the like. "Business-wide" as defined herein means across all facets of an enterprise business, including, but not limited to, divisions, subsidiaries, business units/lines-of-business, product/service lines and the like. As such, business-wide customer impact trends 28 take into account performance metrics measured across the entire business. In addition to business-wide customer impact trends, alternate embodiments of the invention provide for determining secondary level customer impact trends, such as business unit/line of business based on the business performance metrics; tertiary level customer impact trends, such as product/service-line or the like; customer unit customer impact trends, such as customer division, geographic region, customer location/site or the like or other customer impact trends associated with a portion of the business.

At Event 130, the one or more customer impact trends are stored in computing device memory. In addition, in alternate embodiments, the customer impact trends and the business performance trends may be communicated to a dashboard application configured to provide business associates and/or customer associates network access to a customer's business performance metrics, impact trends and the like.

At optional Event 140, a computing device processor determines if one or more of the business-wide customer impact trends warrant generating an alert. An alert may be generated if the customer impact trend meets or exceeds predetermined criteria for generating an alert. The predetermined criteria may include, but is not limited to, the type of customer impact trend, the rate of the customer impact trend, the time of the day/week/month/year of the impact trend and the like. In addition to determine of alerts are warranted for the business-wide customer impact trends, in alternate embodiments, alerts may be determined to be warranted for secondary level customer impact trends, tertiary level customer impact trends, customer unit customer impact trends and the like.

At optional Event 150, the customer impact alert is generated and communicated to a business entity if the alert is determined to be warranted. The alert serves to notify the designated business entity, such as a dashboard application or a customer service representative, of a significant customer impact trend and allows for the business entity to take immediate action to mitigate or otherwise eliminate the adverse impact trend. The alert may be communicated via one or more predetermined communication means, such as email, text, voice message or the like.

Thus, present embodiments herein disclosed provide for client/customer-centric macro (e.g., business-wide) monitoring of business performance and determination of business-wide customer impact trends associated with the client's/customer's composite relationship with the business. Additionally, embodiments provide for determining customer impact trends at other levels of the business relationship, such as at business unit/line of business levels, product/service levels and the like. Determining business-wide customer impact trends associated with a client's composite relationship with a business, provides for the business to identify problems or potential problems that may adversely impact the global relationship between the overall client entity, such a large corporate entity or conglomerate, and the business implementing the performance monitoring system.

Once performance trends have been determined assessments are made as to whether the trends rise to the level that necessitates immediate attention on behalf of the business to mitigate or eliminate the trend, if so alerts or other notifications are communicated to proper business entities, such as customer service or the like, to resolve the problem(s) associated with adverse performance trends. Such automated communication of alerts provide for corrective action to ensue immediately after a negative impact performance trend is determined, so as mitigate or eliminate further trending.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other updates, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for managing business performance at an individual customer-level, the method comprising:
monitoring, via a computing device processor, a plurality of business performance metrics associated with a customer, wherein the business performance metrics are monitored on a continuous ongoing basis, within all aspects of the business including all business units, business lines, subsidiaries, divisions, product lines and service lines;
dynamically determining, via a computing device processor, one or more business-wide customer impact trends based on the monitoring of the plurality of business performance metrics, wherein a customer impact trend is defined as one of a predetermined rate of movement in a business performance metric over a predetermined time period or a predetermined consistent rater of a business performance metric over a predetermined time period;
determining, via a computing device processor, that one or more of the one or more customer impact trends warrant a customer impact alert, wherein the determination is based on at least one of a type of customer impact trend, rate of the customer impact trend or the business line or product affected by the customer impact trend; and
responsive to determining that the customer impact alert is warranted, determining, via a computing device processor, one or more recipients for the customer impact alert, wherein recipients are determined based on a type of the customer impact trend; and
communicating, via a computing device, the customer impact alert to the determined recipients;
and storing, in a computing device memory, the one or more customer impact trends.

2. The method of claim 1, wherein determining that one or more of the one or more business unit customer impact trends warrant the alert further comprises aggregating results of business unit customer impact trends from different business units to determine corrective action is warranted.

3. The method of claim 1, further comprising determining, via a computing device processor, one or more product-related or service-related customer impact trends based on the plurality of business performance metrics.

4. The method of claim 3, further comprising:
determining, via a computing device processor, that one or more of the one or more product-related or service-related customer impact trends warrant a customer impact alert, wherein the determination is based on at least one of a type of customer impact trend or a rate of the customer impact trend;
responsive to determining that the customer impact alert is warranted, determining, via a computing device processor, one or more recipients for the customer impact alert, wherein recipients are determined based on a type of the customer impact trend; and
communicating, via a computing device, the customer impact alert to the determined recipients.

5. The method of claim 4, wherein determining that one or more of the one or more product-related customer impact trends warrant the alert further comprises aggregating results of product-related customer impact trends from different products to determine corrective action is warranted.

6. The method of claim 1, further comprising determining, via a computing device processor, one or more customer unit-related customer impact trends based on the plurality of business performance metrics, wherein a customer unit includes any divisible unit of the customer including customer units within a geographic region and individual locations.

7. The method of claim 6, further comprising:
determining, via a computing device processor, that one or more of the one or more customer unit-related customer impact trends warrant a customer impact alert, wherein the determination is based on at least one of a type of customer impact trend or a rate of the customer impact trend;
responsive to determining that the customer impact alert is warranted, determining, via a computing device processor, one or more recipients for the customer impact alert, wherein recipients are determined based on a type of the customer impact trend; and
communicating, via a computing device, the customer impact alert to the determined recipients.

8. The method of claim 7, wherein determining that one or more of the one or more customer-unit customer impact trends warrant the alert further comprises aggregating results of customer-related customer impact trends from different customer units to determine corrective action is warranted.

9. An apparatus for managing business performance at an individual customer-level, the apparatus comprising:
a computing platform including a memory and at least one processor; and
a customer-based business performance management application stored in the memory, executable by the processor and including:
a business performance monitoring routing configured to monitor a plurality of business performance metrics associated with a customer, wherein the business performance metrics are monitored, on a continuous ongoing basis, within all aspects of the business including all business units, business lines, subsidiaries, divisions, product lines and service lines;
a business performance trend determination routine configured to dynamically determine one or more business-wide customer impact trends or business-unit customer impact trends based on the monitoring of the plurality of business performance metrics and store the one or more business-wide customer impact trends in the memory, wherein a customer impact trend is defined as one of a predetermined rate of movement in a business performance metric over a predetermined time period or a predetermined consistent rate of a business performance metric over a predetermined time period;
an alert determination and communication routine configured to determine if one or more customer impact trends warrant a customer impact alert, wherein the determination is based on at least one of a type of customer impact trend, rate of the customer impact trend or the business line or product affected by the customer impact trend, if the customer impact alert is determined to be warranted, determine one or more recipients for the customer impact alert, wherein recipients are determined based on a type of the customer impact trend and communicate the customer impact alert to the determined recipients.

10. The apparatus of claim 9, wherein the alert determination routine is further configured to aggregate results of business unit customer impact trends from different business units to determine if corrective action is warranted.

11. The apparatus of claim 9, wherein business performance trend determination routine is further configured to determine one or more product-related or service-related customer impact trends based on the plurality of business performance metrics.

12. The apparatus of claim 11, wherein the alert determination and communication routine is further configured to determine if one or more of the one or more product-related or service-related customer impact trends warrant a customer impact alert, wherein the determination is based on at least one of a type of customer impact trend or rate of the customer impact trend, if the customer impact alert is determined to be warranted, determine one or more recipients for the customer impact alert, wherein recipients are determined based on a type of the customer impact trend and communicate the customer impact alert to the determined recipients.

13. The apparatus of claim 12, wherein the alert determination routine is further configured to aggregate results of product-related customer impact trends from different products to determine if corrective action is warranted.

14. The apparatus of claim 9, wherein the business performance trend determination routine is further configured to determine one or more customer unit-related customer impact trends based on the plurality of business performance metrics, wherein a customer unit includes any divisible unit of the customer including customer units within a geographic region and individual locations.

15. The apparatus of claim 14, wherein the customer-based business management application further includes an alert determination and communication routine is further configured to determine if one or more of the one or more customer unit-related customer impact trends warrant a customer impact alert, wherein the determination is based on at least one of a type of customer impact trend or rate of the customer impact trend, if the customer impact alert is determined to be warranted, determine one or more recipients for the customer impact alert, wherein recipients are determined based on a type of the customer impact trend and communicate the customer impact alert to the determined recipients.

16. The apparatus of claim 15, wherein the alert determination routine is further configured to aggregate results of customer unit-related customer impact trends from different customer units to determine if corrective action is warranted.

17. A computer program product comprising:
a non-transitory computer-readable medium comprising:
a first set of codes for causing a computer to monitor a plurality of business performance metrics associated with a customer, wherein the business performance metrics are monitored, on a continuous ongoing basis, within all aspects of the business including all business units, business lines, subsidiaries, divisions, product lines and service lines;
a second set of codes for causing a computer to dynamically determine one or more business-wide customer impact trends or business-unit customer impact trends based on the monitoring of the plurality of business performance metrics, wherein a customer impact trend is defined as one of a predetermined rate of movement in a business performance metric over a predetermined time period or a predetermined consistent rate of a business performance metric over a predetermined time period;
a third set of codes for causing a computer to determine if one or more of the one or more customer impact trends warrant a customer impact alert, wherein the determination is based on at least one of a type of customer impact trend, rate of the customer impact trend or the business line or product affected by the customer impact trend; and
a fourth set of codes for causing a computer, in response to determining that a customer impact alert is warranted, determine one or more recipients for the customer impact alert, wherein recipients are determined based on a type of the customer impact trend;
a fifth set of codes for causing a computer to communicate the customer impact alert to the determined recipients; and
a fifth set of codes for causing a computer to store the one or more customer impact trends in computing device memory.

18. The computer program product of claim 17, wherein the third set of codes is further configured to aggregate results of business customer impact trends from different business units to determine if corrective action is warranted.

19. The computer program product of claim 17, wherein the second set of codes is further configured to cause the computer to determine one or more product-related or service-related customer impact trends based on the plurality of business performance metrics.

20. The computer program product of claim 19, wherein:
the third set of codes is further configured for causing the computer to determine if one or more of the one or more product-related or service-related customer impact trends warrant a customer impact alert, wherein the determination is based on at least one of a type of customer impact trend or rate of the customer impact trend;
the fourth set of codes is further configured for causing the computer to, in response to determining that a customer impact alert is warranted, determine one or more recipients for the customer impact alert, wherein recipients are determined based on a type of the customer impact trend; and
the fifth set of codes is further configured for causing the computer to communicate the customer impact alert to the determined recipients.

21. The computer program product of claim 20, wherein the third set of codes is further configured to cause the computer to aggregate results of product-related customer impact trends from different products to determine if corrective action is warranted.

22. The computer program product of claim 17, wherein the second set of codes is further configured to cause the computer to determine one or more customer unit-related customer impact trends based on the plurality of business performance metrics, wherein a customer unit includes any divisible unit of the customer including customer units within a geographic region and individual locations.

23. The computer program product of claim 22, wherein:
the third set of codes is further configured for causing the computer to determine if one or more of the one or more customer unit-related customer impact trends warrant a customer impact alert, wherein the determination is based on at least one of a type of customer impact trend or rate of the customer impact trend;

the fourth set of codes is further configured for causing the computer to, in response to determining that a customer impact alert is warranted, determine one or more recipients for the customer impact alert, wherein recipients are determined based on a type of the customer impact trend; and the fifth set of codes is further configured for causing the computer to communicate the customer impact alert to the determined recipients.

24. The computer program product of claim 23, wherein the third set of codes is further configured to cause the computer to aggregate results of customer-related customer impact trends from different customer units to determine if corrective action is warranted.

* * * * *